(12) United States Patent
Wu et al.

(10) Patent No.: US 11,803,749 B2
(45) Date of Patent: Oct. 31, 2023

(54) METHOD AND DEVICE FOR IDENTIFYING KEY TIME POINT OF VIDEO, COMPUTER APPARATUS AND STORAGE MEDIUM

(71) Applicant: TENCENT TECHNOLOGY (SHENZHEN) COMPANY LTD, Guangdong (CN)

(72) Inventors: Tao Wu, Shenzhen (CN); Xu Yuan Xu, Shenzhen (CN); Guo Ping Gong, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 303 days.

(21) Appl. No.: 17/013,953

(22) Filed: Sep. 8, 2020

(65) Prior Publication Data

US 2020/0401808 A1 Dec. 24, 2020

Related U.S. Application Data

(63) Continuation of application No. PCT/CN2019/091490, filed on Jun. 17, 2019.

(30) Foreign Application Priority Data

Jul. 18, 2018 (CN) .......................... 201810791373.3

(51) Int. Cl.
*G06N 3/08* (2023.01)
*G06T 7/11* (2017.01)
(Continued)

(52) U.S. Cl.
CPC .............. *G06N 3/08* (2013.01); *G06F 18/24* (2023.01); *G06N 20/00* (2019.01); *G06T 5/002* (2013.01);
(Continued)

(58) Field of Classification Search
CPC ...... G06V 20/40; G06V 20/41; G06V 10/764; G06V 10/7784; G06V 10/82; G06V 20/46;
(Continued)

(56) References Cited

U.S. PATENT DOCUMENTS

9,979,149 B2 * 5/2018 Peloquin ................. H01R 27/02
2003/0034996 A1 * 2/2003 Li ......................... G06F 16/7834
707/E17.028

(Continued)

FOREIGN PATENT DOCUMENTS

CN 108009486 A 5/2018
CN 108154137 A 6/2018
(Continued)

OTHER PUBLICATIONS

Wen-Li Wei, "Deep-Net Fusion to Classify Shots in Concert Videos," Mar. 2017 (Year: 2017).*
(Continued)

*Primary Examiner* — Andrae S Allison
*Assistant Examiner* — Phuong Hau Cai
(74) *Attorney, Agent, or Firm* — Sughrue Mion, PLLC

(57) ABSTRACT

A method for recognizing a key time point in a video includes: obtaining at least one video segment by processing each image frame in the video by an image classification model; determining a target video segment in the at least one video segment based on a shot type; obtaining respective locations of a first object and a second object in an image frame of the target video segment by an image detection model; and based on a distance between the location of the first object and the location of the second object in the image frame satisfying a preset condition, determining a time point of the image frame as the key time point of the video.

20 Claims, 5 Drawing Sheets

(51) Int. Cl.
*G06T 7/73* (2017.01)
*G06N 20/00* (2019.01)
*G06T 5/00* (2006.01)
*G06V 20/40* (2022.01)
*G06F 18/24* (2023.01)
*G06V 10/764* (2022.01)
*G06V 10/778* (2022.01)
*G06V 10/82* (2022.01)

(52) U.S. Cl.
CPC .............. *G06T 7/11* (2017.01); *G06T 7/75* (2017.01); *G06V 10/764* (2022.01); *G06V 10/7784* (2022.01); *G06V 10/82* (2022.01); *G06V 20/41* (2022.01); *G06V 20/46* (2022.01); *G06V 20/49* (2022.01); *G06T 2207/10016* (2013.01)

(58) Field of Classification Search
CPC .......... G06V 20/49; G06V 20/42; G06T 7/11; G06T 5/002; G06T 7/75; G06T 2207/10016; G06K 9/6267; G06N 20/00; G06N 3/08; G06N 3/0454; H04N 21/44008; H04N 21/8456
See application file for complete search history.

(56) References Cited

U.S. PATENT DOCUMENTS

2005/0074161 A1* 4/2005 Ancona .............. A63B 71/0605
                                                          382/181
2008/0118153 A1* 5/2008 Wu ........................ G06V 20/40
                                                          382/190

FOREIGN PATENT DOCUMENTS

| CN | 108229262 A | 6/2018 | |
|---|---|---|---|
| CN | 108229336 A | 6/2018 | |
| CN | 108810620 A | 11/2018 | |
| JP | 4606278 B2 * | 1/2011 | .............. G06T 7/20 |
| JP | 4979029 B2 * | 4/2012 | .............. G06T 7/20 |

OTHER PUBLICATIONS

Ed Gronenschild, "the Accuracy and Reproducibility of a Global Method to Correct for Geometric Image Distortion in the X-ray Imaging Chain," May 1997 (Year: 1997).*

"Cees G.M. Snoek et al., Multimodal Video Indexing: A Review of the State-of-the-art, Multimedia Tools and Applications, 25, 5-35, 2005" (Year: 2005).*

"Antonio Furnari et al., Personal-location-based temporal segmentation of egocentric videos for lifelogging applications, Journal of Visual Communication and Image Representation 52 (Apr. 2018) 1-12" (Year: 2018).*

Written Opinion dated Sep. 11, 2019 from the International Bureau in International Application No. PCT/CN2019/091490.

Wen-Li Wei et al., "Deep-Net Fusion to Classify Shots in Concert Videos", 2017 IEEE International Conference on Acoustics, Speech and Signal Processing (ICASSP), IEEE, Mar. 5, 2017, pp. 1383-1387 (5 pages total).

Extended European Search Report dated Aug. 4, 2021 in Application No. 19837223.7.

Supplementary European Search Report dated Aug. 24, 2021 in Application No. 19737223.7.

International Search Report for PCT/CN2019/091490 dated Sep. 11, 2019 [PCT/ISA/210].

* cited by examiner

METHOD AND DEVICE FOR IDENTIFYING KEY TIME POINT OF VIDEO, COMPUTER APPARATUS AND STORAGE MEDIUM

CROSS-REFERENCE TO RELATED APPLICATION(S)

This application is a continuation of PCT/CN2019/091490, filed on Jun. 17, 2019, and claims priority to Chinese Patent Application No. 201810791373.3, entitled "METHOD AND DEVICE FOR IDENTIFYING KEY TIME POINT OF VIDEO, COMPUTER APPARATUS, AND STORAGE MEDIUM," filed with the National Intellectual Property Administration, PRC on Jul. 18, 2018, which are incorporated by reference herein in their entireties.

BACKGROUND

1. Field

Embodiments of the disclosure relate to the field of machine learning, and in particular, to a method and an apparatus for recognizing a key time point in a video, a computer device, and a storage medium.

2. Description of Related Art

Recently, there has been some development toward quickly determining a key time point in a video clip of a sports match, such as, football, basketball, or the like, to improve user experience of an application. In the related art, for the sports match video, the key time point is usually determined through image processing algorithms.

However, conventional image processing algorithms have relatively poor robustness and low adaptability for complex scenes and the camera movement, resulting in low accuracy of the determined key time point.

SUMMARY

According to an embodiment, there is provided a method for recognizing a key time point in a video, performed by a computer device, the method including: obtaining at least one video segment by processing each frame in the video by an image classification model, the image classification model being a machine learning model obtained by training according to a first sample image frame marked with a shot type, wherein each of the at least one video segment includes at least two consecutive image frames in the video and each of the at least one video segment corresponds to one shot type among a plurality of shot types; determining a target video segment in the at least one video segment based on the shot type of the at least one video segment; obtaining a first location of a first object and a second location of a second object in an image frame of the target video segment by an image detection model, the image detection model being a machine learning model obtained by training according to a second sample image frame marked with the first location of the first object and the second location of the second object; and based on a distance between the first location of the first object and the second location of the second object in the image frame satisfying a preset condition, determining a time point of the image frame as the key time point of the video.

According to an embodiment, there is provided an apparatus for recognizing a key time point in a video including at least one memory storing computer program code; and at least one processor configured to access the at least one memory and operate as instructed by the computer program code. The computer program code includes: first processing code configured to cause the at least one processor to obtain at least one video segment by processing each frame in the video by an image classification model, the image classification model being a machine learning model obtained by training according to a first sample image frame marked with a shot type, wherein each of the at least one video segment includes at least two consecutive image frames in the video and each of the at least one video segment corresponds to one shot type among a plurality of shot types; second processing code configured to cause the at least one processor to determine a target video segment in the at least one video segment based on the shot type of the at least one video segment and obtain a first location of a first object and a second location of the second object in an image frame of the target video segment by an image detection model, the image detection model being a machine learning model obtained by training according to a second sample image frame marked with the first location of the first object and the second location of the second object; and determining code configured to cause the at least one processor to, based on a distance between the first location of the first object and the second location of the second object in the image frame satisfying a preset condition, determine a time point of the image frame as the key time point of the video.

According to an embodiment, there is provided a non-transitory computer-readable storage medium storing at least one computer program code configured to cause a computer processor to: obtain at least one video segment by processing each frame in a video by an image classification model, the image classification model being a machine learning model obtained by training according to a first sample image frame marked with a shot type, wherein each of the at least one video segment includes at least two consecutive image frames in the video and each of the at least one video segment corresponds to one shot type among a plurality of shot types; determine a target video segment in the at least one video segment based on the shot type of the at least one video segment; obtain a first location of a first object and a second location of a second object in an image frame of the target video segment by an image detection model, the image detection model being a machine learning model obtained by training according to a second sample image frame marked with the first location of the first object and the second location of the second object; and based on a distance between the first location of the first object and the second location of the second object in the image frame satisfying a preset condition, determine a time point of the image frame as a key time point of the video.

BRIEF DESCRIPTION OF THE DRAWINGS

The following briefly describes the accompanying drawings of the embodiments. The accompanying drawings in the following descriptions show only some embodiments of the disclosure, and a person of ordinary skill in the art may still derive other embodiments from the accompanying drawings without creative efforts.

DESCRIPTION

Embodiments are described in detail herein, and examples thereof are shown in the accompanying drawings. When the following descriptions are made with reference to the accompanying drawings, unless indicated otherwise, same numbers in different accompanying drawings represent same or similar elements. The following implementations described in the following embodiments do not represent all implementations.

The embodiments of the disclosure provide an efficient and highly accurate solution for recognizing a key time point in a video. According to an embodiment, segmentation and object detection can be performed on a video through a machine learning model, and a key time point in the video can be recognized according to the detection result. For ease of understanding, terms used in describing the embodiments are explained below.

(1) Shot Type

A shot type may be a shooting type of a camera or the like for capturing a scene as an image frame. For example, the shot type may include at least one of a long shot, a close shot, a close-up shot, an audience shot, or an advertisement shot.

(2) Machine Learning Model

A machine learning model may include, but is not limited to, a model obtained by training through pre-marked training data. Specifically, the embodiments may include at least an image classification model and an image detection model.

The image classification model may be configured to process an image frame to determine a shot type to which an inputted image frame belongs. For example, the image classification model may be a convolutional neural network (CNN) model.

The image detection model may be configured to detect a designated object in the inputted image frame, for example, a designated person or object. For example, the image detection model may be a faster region with convolutional neural network features (Faster-RCNN) model.

Figure 1:
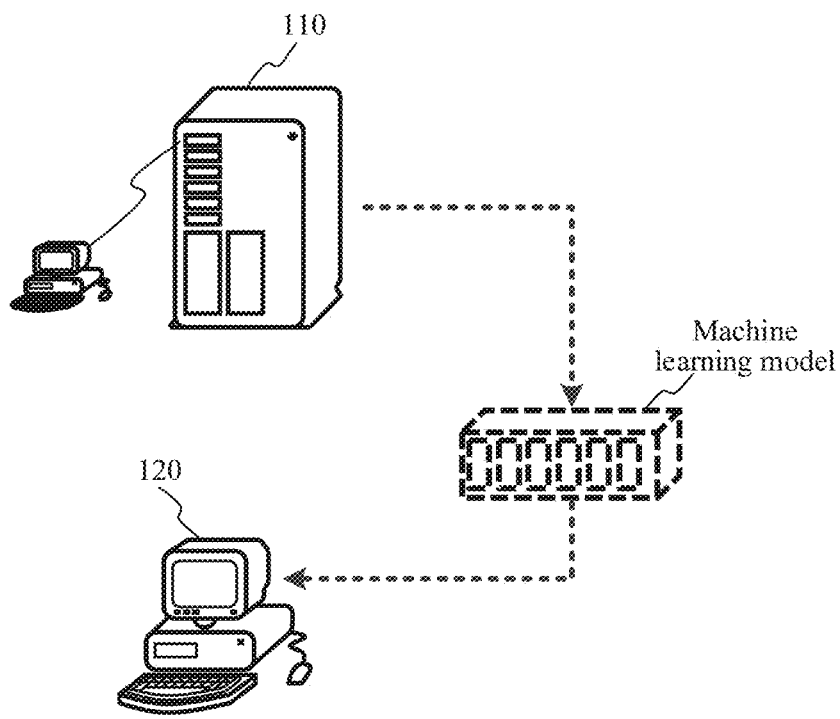
FIG. 1 is a framework diagram of a model training and a key time point recognition according to an embodiment.

The embodiments may include a model training stage and a recognition stage. FIG. 1 is a framework diagram of a model training and a key time point recognition according to an embodiment. As shown in FIG. 1, at the model training stage, a model training device 110 obtains an image classification model through training according to a first image frame sample, and obtains an image detection model through training according to a second image frame sample, the first image frame sample being an image frame marked with a shot type, the second image frame sample being an image frame marked with a location of a first object and a location of a second object. At the recognition stage, a recognition device 120 recognizes a key time point in a video through the trained machine learning models (that is, the image classification model and the image detection model) and an inputted video.

The model training device 110 and the recognition device 120 may be computer devices with a machine learning capability. For example, the computer device may be a fixed computer device such as a personal computer, a server, or the like. Alternatively, the computer device may also be a mobile computer device, such as a smartphone, a tablet computer, an E-book reader, or the like.

The model training device 110 and the recognition device 120 may be the same device. Alternatively, the model training device 110 and the recognition device 120 may also be different devices. Moreover, when the model training device 110 and the recognition device 120 are different devices, the model training device 110 and the recognition device 120 may be devices of the same type. For example, the model training device 110 and the recognition device 120 may both be personal computers. Also, the model training device 110 and the recognition device 120 may also be devices of different types. For example, the model training device 110 may be a server, and the recognition device 120 may be a personal computer or the like. However, a specific type of the model training device 110 and the recognition device 120 is not limited to the embodiments described herein.

When the model training device 110 obtains the image classification model through training according to the first image frame sample, the first image frame sample may be extracted from a video sample. To avoid an over-fitting training result due to the excessive similarity between image frame samples in the first image frame sample, the model training device 110 may extract an image frame from the frames of the video sample, and input the extracted image frame to a marking person to manually mark a corresponding shot type to obtain the first image frame sample.

The image classification model may obtain probabilities that the inputted image frame belongs to various shot types. When a probability that the inputted image frame belongs to one shot type is greater than a preset probability threshold (for example, 80%), it may be considered that the image classification model recognizes the shot type of the image frame successfully (that is, a shot type of which the corresponding probability is greater than the preset probability threshold).

Furthermore, to save a marking time and improve the efficiency of sample marking and model training, according to an embodiment, the model training device 110 may first obtain an initial classification model through training according to some first image frame samples, and then input an unmarked image frame into the initial classification model. When the initial classification model recognizes a shot type to which the image frame belongs successfully, the model training device 110 uses the image frame and the shot type recognized by the initial classification model as a new first image frame sample, and when the initial classification model cannot recognize a shot type to which the image frame belongs successfully, the model training device 110 outputs the image frame to a marking person to manually mark a corresponding shot type, and uses the image frame and the shot type manually marked by the marking person as a new first image frame sample. After obtaining the new first image frame sample, the model training device 110 continues to train the initial classification model according to the new first image frame sample until the image classification model is obtained.

Figure 2:
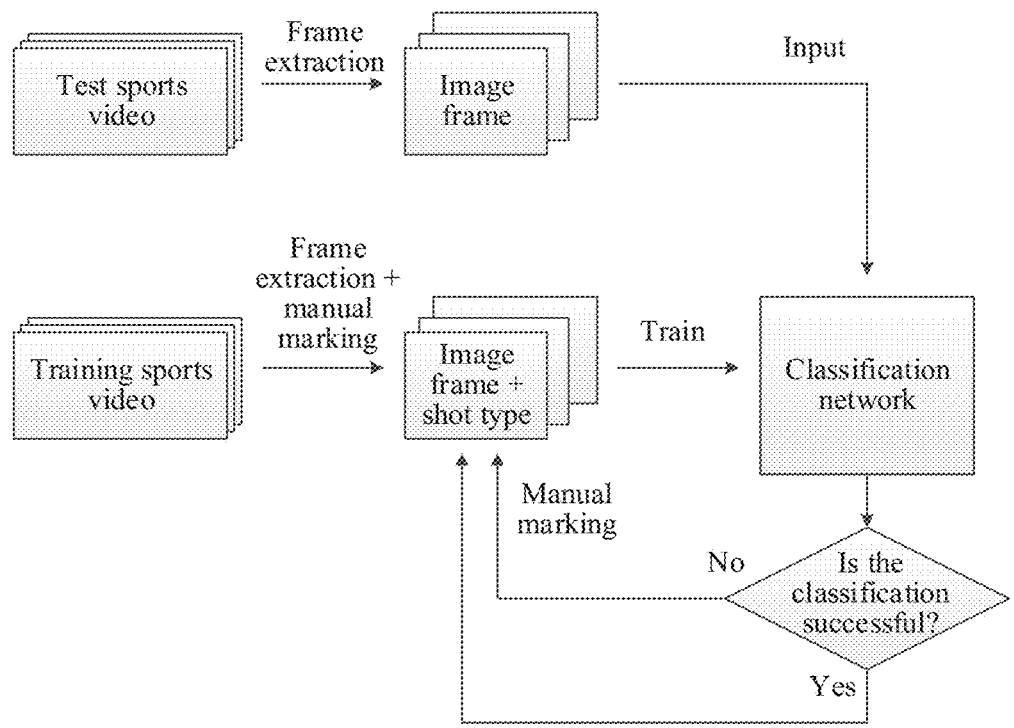
FIG. 2 is a schematic flowchart of training an image classification model according to an embodiment.

For example, FIG. 2 is a flowchart of training an image classification model according to an embodiment. As shown in FIG. 2, using a sports match video as an example, a model training device collects a training sports video, and extracts an image frame in a discontinuous-frame sampling manner, and a marking person marks different scenes of the extracted image frames (corresponding to the shot types). The model training device then classifies different shot types into N types (for example, a long shot, a close shot, an advertisement shot, a close-up shot, and the like), extracts features and performs training through the CNN model to obtain the initial classification model (that is, a classification network in FIG. 2). Then, the model training device extracts image frames from more test sports videos in a discontinuous-frame manner and classifies the extracted image frames through an initial training model. If the classification succeeds, the extracted image frames and the shot types obtained through the classification by the initial classification model are added into a training sample. If the classification fails, the marking person marks the shot types of the extracted image frames and the extracted image frames, and the marking result are added to the training sample to gradually increase the quantity of samples and optimize the initial classification model continuously, until the image classification model is obtained. For example, when the accuracy of the initial classification model reaches a predetermined threshold, the initial classification model may be determined as the image classification model.

During the obtaining of the image detection model through training according to the second image frame sample, the marking person may collect, in advance, an image frame including a first object and/or a second object in a sports video, mark locations of the first object and/or the second object in the collected image frame, and use the image frame marked with the locations of the first object and/or the second object as the second image frame sample.

The first object and the second object may be sports equipment related to outcome or score of a sports match corresponding to the sports video. For example, when a designated object needs to be moved to a designated location to win or score in a sports match, the first object and the second object may be marked as the designated objects and/or the designated locations. Specifically, the first object and the second object may be a basketball and a basketball hoop, respectively. As another example, the first object and the second object may be a football and a field goal, respectively.

To save marking time and improve the efficiency of sample marking and model training, according to an embodiment, the model training device 110 may first obtain an initial detection model through training according to some second image frame samples, and then input an image frame not marked with an object location into the initial detection model. When the initial detection model recognizes locations of a first object and/or a second object in the image frame successfully, the model training device 110 uses the image frame and the locations of the first object and/or the second object recognized by the initial detection model as a new second image frame sample, and when the initial detection model does not recognize locations of a first object and/or a second object in the image frame, the model training device 110 outputs the image frame to a marking person to manually mark corresponding locations of the first object and/or the second object, and uses the manually marked image frame with the locations of the first object and/or the second object as a new second image frame sample. After obtaining the new second image frame sample, the model training device 110 continues to train the initial detection model according to the new second image frame sample until the image detection model is obtained.

Figure 3:
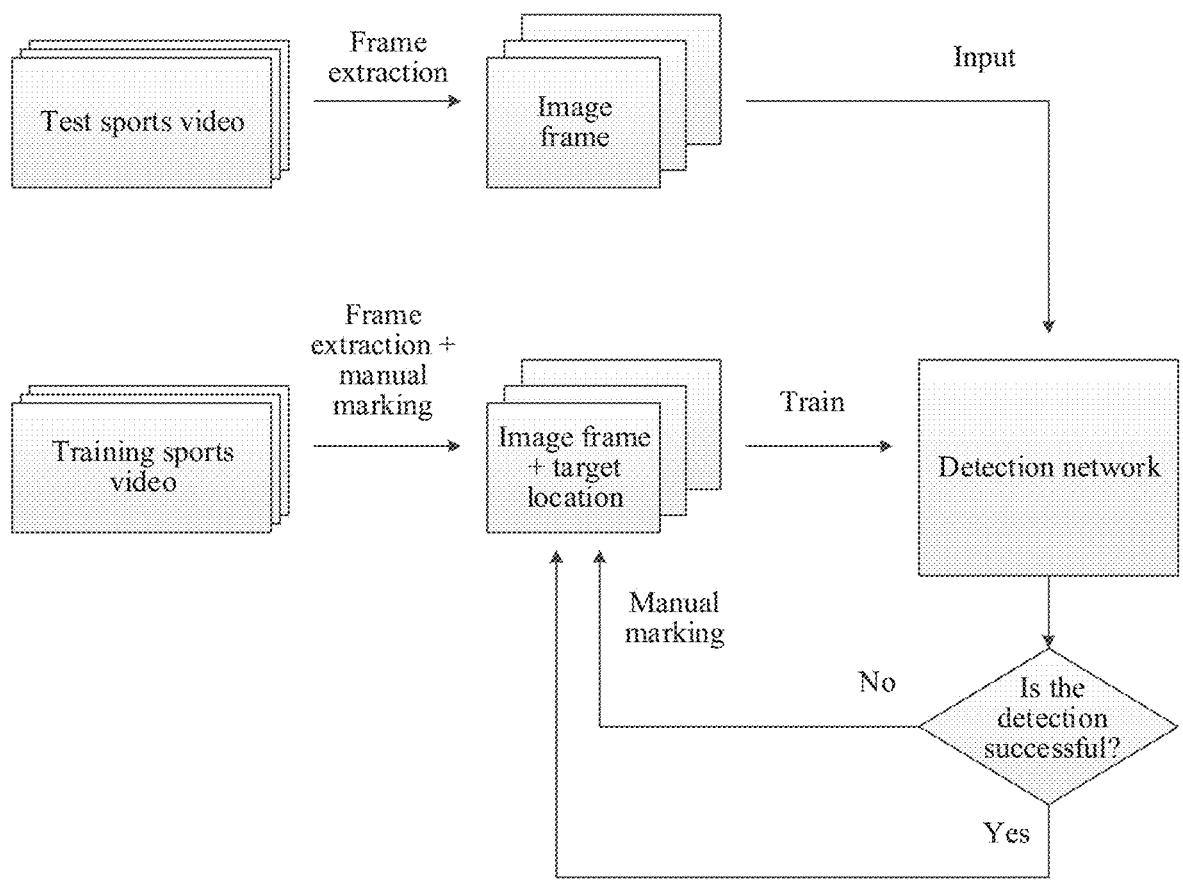
FIG. 3 is a schematic flowchart of training an image detection model according to an embodiment.

For example, FIG. 3 is a schematic flowchart of training an image detection model according to an embodiment. As shown in FIG. 3, using a sports match video as an example, a model training device collects a training sports video, and extracts an image frame in a discontinuous-frame sampling manner. A marking person may manually mark locations of a first object and/or a second object in each extracted image frame. The model training device then extracts features and performs training through the Faster-RCNN model to obtain an initial detection model (that is, a detection network in FIG. 3). Then, the model training device extracts image frames from more test sports videos in a discontinuous-frame manner and detects the extracted image frames through an initial training model. If the detection succeeds, the extracted image frames and the locations of the first object and/or the second object obtained through the detection by the initial detection model are added into a training sample. However, if the detection fails, the marking person may mark the locations of the first object and/or the second object in the extracted image frame, and the extracted image frames and the marking result may be added to the training sample to gradually increase the quantity of samples and optimize the initial detection model continuously until the image detection model is obtained.

Sports video and test sports video used for training the image classification model and training the image detection model may be the same sports video, or may be different sports videos.

Figure 4:
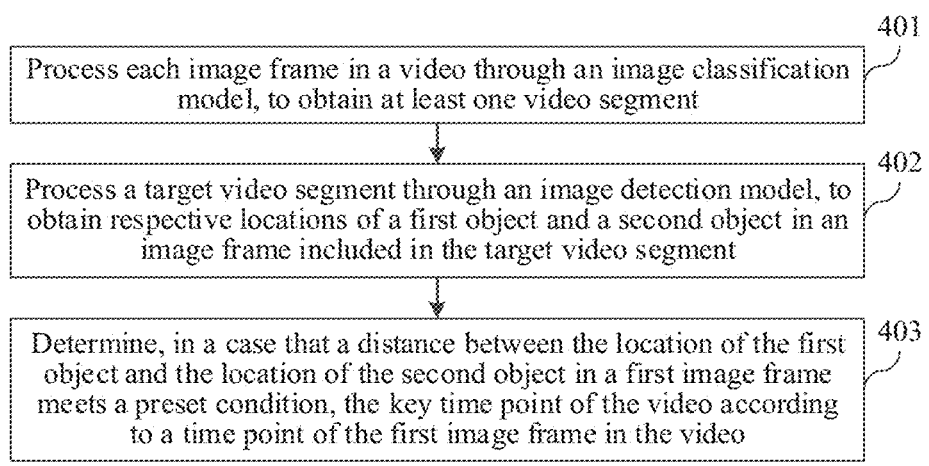
FIG. 4 is a flowchart of a method for recognizing a key time point in a video according to an embodiment.

FIG. 4 is a flowchart of a method for recognizing a key time point in a video according to an embodiment. As shown in FIG. 4, a method of recognizing a key time point in a video by the recognition device 120 may be as follows:

In Step 401, the method may include processing each image frame in a video through an image classification model to obtain at least one video segment.

Here, each video segment may include at least two adjacent image frames in the video, and each video segment may correspond to one shot type.

In Step 402, the method may include processing a target video segment through an image detection model to obtain respective locations of a first object and a second object in an image frame included in the target video segment.

Here, the target video segment being a video segment corresponding to a designated shot type in the at least one video segment.

In Step 403, the method may include determining, in a case that a distance between the location of the first object and the location of the second object in a first image frame satisfies a preset condition, a key time point of the video according to a time point of the first image frame in the video.

In other words, when the distance between the location of the first object and the location of the second object in the first image frame is a predetermined distance or more, the recognition device determines a time point of the first image frame in the video as the key time point of the video.

According to an embodiment consistent with FIG. 4, a video is classified according to a pre-trained machine learning model, and locations of a first object and a second object in an image frame of a video segment corresponding to a designated shot type may be detected. Furthermore, the pre-trained machine learning model determines whether a time point corresponding to the image frame can be used for determining a key time point of the video based on a location relationship between the first object and the second object in the image frame. The machine learning model has relatively strong adaptability in image classification and object detection fields, and therefore, a key time point in a video can be recognized accurately, thereby improving the accuracy of recognition.

According to an embodiment, a sports video may be analyzed by using a machine learning technology. Specifically, different scenes (that is, the shot types) may be divided and a key time point may be extracted for each scene to facilitate subsequent video clipping and other processing. In a process of recognizing the key time point based on the image classification model and the image detection model, the recognition device may further perform smoothing processing on results outputted by the image classification model and the image detection model respectively, to improve the accuracy of recognizing a key time point.

Specifically, for example, for particularity of a sports video and at a first stage, the CNN model is configured to extract scene features under different shot types, and an image frame in the video is classified. To improve the accuracy of classification, filtering may be performed in time domain after the classification to ensure the smoothness of the video segment. Thereafter, object detection (for example, a basketball in a basketball match video) may be performed on a valid segment (that is, a video segment corresponding to a designated shot type) with reference to a classification result of the first stage to capture key time point information (for example, a shot). Further, to improve the accuracy of recognizing a key time point, filtering may be performed in time domain to remove false detections, and a tracking algorithm may be used for filling a frame so that the frame can be enhanced to better detect objects in the frame and to reduce the miss rate of key shots. Accordingly, the scene classification technology and the object detection technology in the machine learning are combined for detecting a key time point of a sports video, and particularity of a sports video and a capability of the machine learning technology on video analysis may be improved to provide great convenience for extracting a key time point in a sports video.

Figure 5:
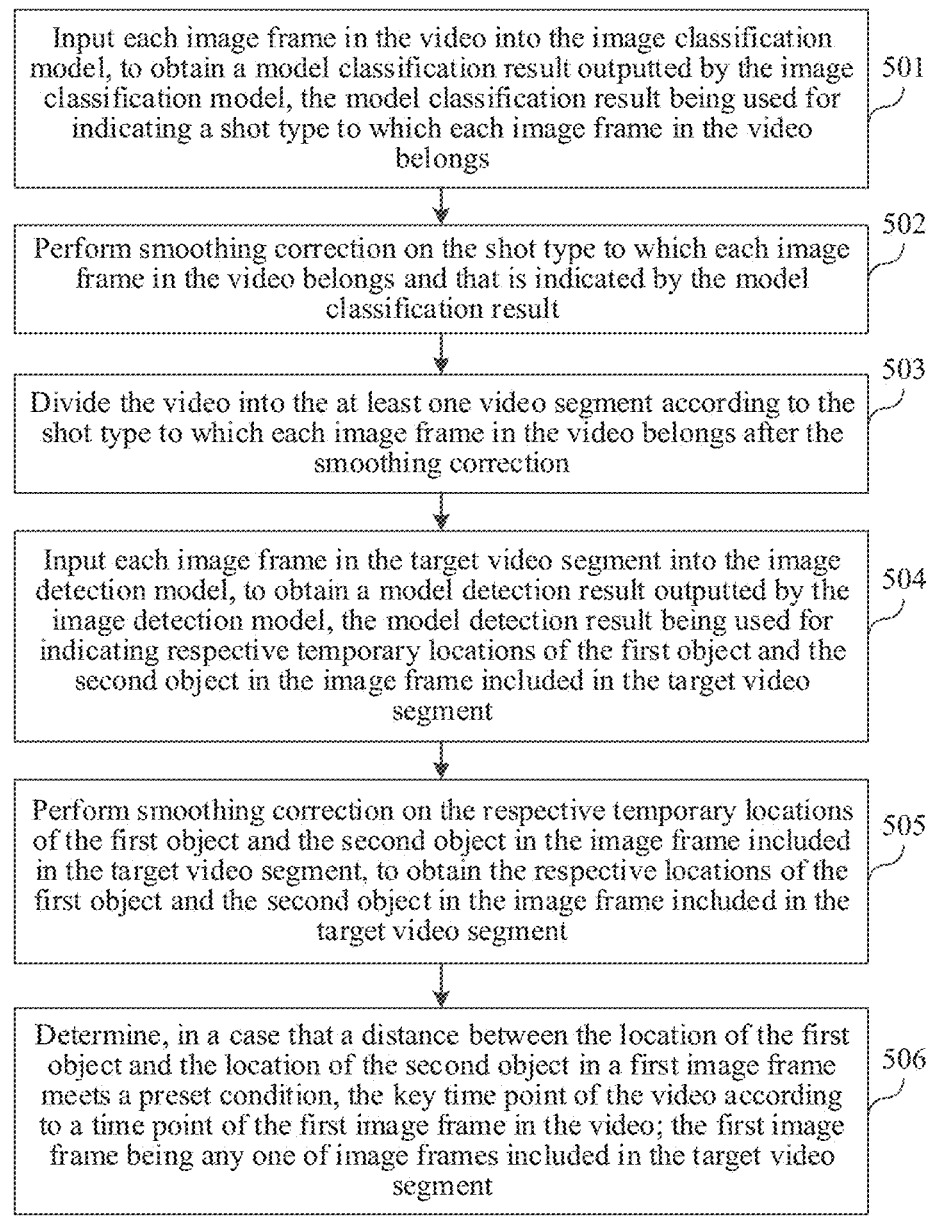
FIG. 5 is a flowchart of a method for recognizing a key time point in a video according to an embodiment.

FIG. 5 is a flowchart of a method for recognizing a key time point in a video according to an embodiment. The method for recognizing a key time point in a video may be performed by a computer device, for example, the recognition device 120 shown in FIG. 1. As shown in FIG. 5, the method for recognizing a key time point in a video may include the following steps:

Step 501. Input each image frame in the video into the image classification model to obtain a model classification result outputted by the image classification model, the model classification result being used for indicating a shot type to which each image frame in the video belongs.

The image classification model is a machine learning model obtained through training according to a first image frame sample, the first image frame sample being an image frame marked with a shot type.

In this embodiment, the image classification model may classify image frames in the inputted video frame by frame, that is, may perform feature extraction on each inputted image frame and calculate a probability that the image frame belongs to each shot type, and determine a shot type corresponding to a maximum probability as a shot type to which the image frame belongs.

Step 502. Perform smoothing correction according to the shot type of each image frame in the video and that is indicated by the model classification result.

In this embodiment, the recognition device may obtain a category mode of a first image group and a category mode of a second image group. Here, the category mode indicates a shot type in the image group with a maximum quantity of corresponding image frames. For example, the first image group may include r image frames prior to the second image frame among a plurality of image frames, and the second image group may include r image frames subsequent to the second image frame among the plurality of image frames. The second image frame may be any image frame in the video other than the first r frames and the last r frames, r being an integer greater than or equal to 1. The recognition device sets, in a case that a shot type indicated by the category mode of the first image group is the same as a shot type indicated by the category mode of the second image group, the shot type to which the second image frame belongs to the shot type indicated by the category mode of the first image group.

In the example in which the foregoing video is a sports video, after the model training device obtains a classification network (that is, the foregoing image classification model) through training, the recognition device classifies the sports video through the classification network frame by frame to obtain a shot type sequence of the entire sports video. Every scene of the sports match has a specific duration, and each scene constitutes the duration of the sports video. According to an embodiment, a filter f with a radius r may be used in time domain to filter to remove a mutation frame in time domain caused by false classification. A specific filtering manner is as follows:

For a $t^{th}$ frame in the sports video, a category mode of a $(t-r)^{th}$ frame to a $(t-1)^{th}$ frame and a category mode of a $(t+1)^{th}$ frame to a $(t+r)^{th}$ frame are calculated. If the two modes are the same shot type C, the $t^{th}$ frame is classified into the shot type C, and otherwise, the shot type of the $t^{th}$ frame remains unchanged.

For example, when the category mode of the first image group or the second image group is obtained, if there are two or more shot types in the first image group or the second image group with a maximum quantity of corresponding image frames, the shot type of the second image frame is not corrected.

For example, if r is 10, that is 10 image frames in the first image group, a quantity of image frames corresponding to a first shot type and a quantity of image frames corresponding to a second shot type are both 4. In other words, there are two shot types in the first image group with a maximum quantity of corresponding image frames. In this case, the recognition device may not perform correction on the shot type of the second image frame, that is, the shot type of the second image frame is maintained as the shot type indicated by the model classification result.

Furthermore, when a smoothing correction is performed on the shot type to which each image frame belongs in the foregoing steps, the smoothing correction may be performed on the shot type of each image frame in the video from the front to the back starting from an $(r+1)^{th}$ image frame of the video. Alternatively, the smoothing correction may be performed on the shot type of each image frame in the video from the back, that is, starting from an $(r+1)^{th}$ image frame from the end of the video. However, a sequence in which the recognition device performs the smoothing correction on the image frames in the video is not limited to this embodiment.

Based on the foregoing, the second image frame may be any image frame between the $(r+1)^{th}$ image frame in the video and the $(r+1)^{th}$ image frame from the end in the video, and the smoothing correction may not be performed on the shot types to which the first r frames and the last r frames in the video belong, that is, the shot types to which the first r frames and the last r frames in the video belong are maintained as the shot type recognized by the image classification model.

In another example, the smoothing correction is not performed on the shot types to which the first image frame and the last image frame in the video belong. For a $p^{th}$ image frame ($2 \leq p \leq r$, where p is an integer) in the first r frames of the video, the recognition device may obtain a category mode (that is, a shot type in first p−1 image frames with a maximum quantity of corresponding image frames) of an image group including the p−1 image frames previous to the $p^{th}$ image frame, and obtains a category mode (that is, a shot type in r image frames subsequent to the $p^{th}$ image frame with a maximum quantity of corresponding image frames) of an image group including the r image frames subsequent to the $p^{th}$ image frame (that is, from a $(p+1)^{th}$ image frame to a $(p+r)^{th}$ image frame). When a shot type indicated by the category mode of the image group including the first p−1 image frames is the same as a shot type indicated by the category mode of the image group including the r image frames subsequent to the $p^{th}$ image frame, the shot type to which the $p^{th}$ image frame belongs is set to the shot type indicated by the category mode of the image group including the first p−1 image frames.

For example, assuming that r is 10, the recognition device maintains the shot type of the first frame in the video unchanged. When p is 5, the recognition device compares a shot type in the first to fourth frames with a maximum quantity of corresponding image frames with a shot type in the sixth to fifteenth frames with a maximum quantity of corresponding image frames. When the two are consistent, the shot type of the fifth frame is set to the shot type in the first to fourth frames with the maximum quantity of corresponding image frames.

For the $q^{th}$ image frame from the end ($2 \leq q \leq r$, where q is an integer) in the last r frames of the video, the recognition device may obtain a category mode of an image group including q−1 image frames subsequent to the $q^{th}$ image frame from the end, and obtain a category mode of an image group including r image frames previous to the $q^{th}$ image frame (that is, from a $(q+1)^{th}$ image frame from the end to a $(q+r)^{th}$ image frame from the end). When a shot type indicated by the category mode of the image group including the last q−1 image frames is the same as a shot type indicated by the category mode of the image group including the r image frames prior to the $q^{th}$ image frame from the end, the shot type to which the $q^{th}$ image frame from the end belongs is set to the shot type indicated by the category mode of the image group including the last q−1 image frames.

Step 503. Divide the video into at least one video segment according to the shot type to which each image frame in the video belongs after the smoothing correction.

The recognition device may divide the video into at least one temporary video segment according to the shot type to which each image frame in the video belongs after the smoothing correction. The shot types to which image frames included in each temporary video segment may be the same, and the shot types to which image frames included in two adjacent temporary video segments may be different. Also, the recognition device may modify, in a case that a quantity of image frames included in a target temporary video segment is less than a preset quantity threshold, a shot type to which each image frame in the target temporary video segment belongs into a shot type to which each image frame in a temporary video segment previous to the target temporary video segment belongs, and combine the target temporary video segment into the temporary video segment previous to the target temporary video segment. The target temporary video segment may be any temporary video segment in the at least one temporary video segment other than a first temporary video segment, and the recognition device may use a remaining temporary video segment after the combination as the at least one video segment.

Furthermore, when the quantity of the image frames included in the target temporary video segment is not less than the preset quantity threshold, the recognition device may not modify the shot type of the image frame in the target temporary video segment.

In the example in which the foregoing video is a sports video, after the filtering is performed, considering the continuity of the video segmentation, some short video segments with short durations may be removed. Specifically, a threshold T may be set in the recognition device, and lengths (that is, quantities of image frames) of video segments are determined one by one according to a time sequence of the video segments. For a video segment with a length less than T, the recognition device modifies a shot type of the video segment into a shot type corresponding to a previous video segment, to combine the video segment with a short duration with the previous video segment. For a video segment with a length not less than T, the recognition device does not modify the shot type corresponding to the video segment.

For example, assuming that the recognition device divides the video into 5 temporary video segments (e.g., a temporary video segment 1, a temporary video segment 2, a temporary video segment 3, a temporary video segment 4, and a temporary video segment 5) according to the shot type to which each image frame in the video belongs after the smoothing correction, the recognition device first determines that a quantity of image frames in the temporary video segment 2 is less than the preset quantity threshold (e.g., 100), and modifies a shot type to which each image frame in the temporary video segment 2 belongs into a shot type to which each image frame in the temporary video segment 1 belongs, to combine the temporary video segment 2 with the temporary video segment 1 to obtain a temporary video segment 1'. In this case, the temporary video segments of the video are the temporary video segment 1', the temporary video segment 3, the temporary video segment 4, and the temporary video segment 5. Then, if the recognition device determines that a quantity of image frames in the temporary video segment 3 is less than 100, and modifies a shot type to which each image frame in the temporary video segment 3 belongs into a shot type of each image frame in the temporary video segment 1', and combines the temporary video segment 3 with the temporary video segment 1' to obtain a temporary video segment 1". In this case, the temporary video segments of the video are a temporary video segment 1", the temporary video segment 4, and the temporary video segment 5. Further, if the recognition device determines that a quantity of image frames in the temporary video segment 4 and a quantity of image frames in the temporary video segment 5 are not less than 100, then it maintains shot types of the image frames in the temporary video segment 4 and the temporary video segment 5. Accordingly, the remaining temporary video segments after the combination are the temporary video segment 1", the temporary video segment 4, and the temporary video segment 5.

In addition, in the performing of the combination of the temporary video segments in the foregoing steps, the combination and the determining may be performed on the temporary video segments of the video from the front to the back starting from a second temporary video segment of the video. Alternatively, the combination and the determining may be performed on the temporary video segments of the video from the back to the front starting from a last temporary video segment of the video. However, a sequence in which the recognition device performs the combination and the determining on the temporary video segments of the video is not limited thereto. For example, when the video is divided into 5 temporary video segments, (that is, for example, the temporary video segment 1, the temporary video segment 2, the temporary video segment 3, the temporary video segment 4, and the temporary video segment 5), the recognition device may first determine whether a quantity of image frames in the temporary video segment 4 is less than the preset quantity threshold, and then determine whether a quantity of image frames in the temporary video segment 3 is less than the preset quantity threshold.

Through the foregoing time-domain filtering and segment combination, on one hand, some frames with false classification may be corrected. On the other hand, the smoothness of the segments of the entire video may be ensured.

Step 504. Input each image frame in the target video segment into the image detection model to obtain a model detection result outputted by the image detection model. Here, the model detection result may be used for indicating respective temporary locations of the first object and the second object in the image frame included in the target video segment.

The target video segment is a video segment corresponding to a designated static type in the at least one video segment obtained in step 503.

For example, when the video is a sports video as described earlier, and in the sports video, an important scene in the game usually appears in a long shot, a close shot, and a close-up shot. Therefore, according to an embodiment, the target video segment may be a video segment of which a corresponding shot type is a designated shot type, such as a long shot, a close shot, a close-up shot, or the like. After performing segmentation on the video, the recognition device performs object detection only on a target video segment corresponding to the designated shot type, and may not perform object detection on video segments other than the video segment corresponding to the designated shot type to avoid an unnecessary detection process, thereby improving the efficiency of recognizing the key time point.

Furthermore, the image detection model may perform object detection on image frames in the inputted target video segments frame by frame. That is, the image detection model may perform feature extraction on each inputted image frame and calculate a probability that a target object (that is, any one of the first object and second object) is located in each location in the image frame, and determine a location corresponding to a maximum probability as a temporary location of the target object in the image frame.

Step 505. Perform smoothing correction on the respective temporary locations of the first object and the second object in the image frame included in the target video segment to obtain the respective locations of the first object and the second object in the image frame included in the target video segment.

The recognition device may obtain temporary locations of a target object in image frames of a third image group and a fourth image group, the target object being any one of the first object and the second object. Here, the third image group may include w image frames prior to a third image frame among a plurality of image frames, and the fourth image group may also include w image frames subsequent to the third image frame among the plurality of image frames in the video. The third image frame may be any image frame in the target video segment other than the first w frames and the last w frames, where w is an integer greater than or equal to 1. The recognition device obtains an average location. The average location may be an average value of the temporary locations of the target object in the image frames of the third image group and the fourth image group. The recognition device corrects the temporary location of the target object in the third image frame according to the average location.

For example, assuming that the target video segment includes 1000 image frames, and w is 5, for a $j^{th}$ image frame in the $6^{th}$ image frame to the $995^{th}$ image frame in the target video segment, the recognition device may obtain an average location of the target object in a $(j-5)^{th}$ image frame to a $(j-1)^{th}$ image frame and in a $(j+1)^{th}$ image frame to a $(j+5)^{th}$ image frame, and correct a temporary location of the target object in the $j^{th}$ image frame according to the obtained average location.

When correcting the temporary location of the target object in the third image frame according to the average location, the recognition device may obtain an offset of the temporary location of the target object in the third image frame relative to the average location; and when the offset is greater than an offset threshold, the temporary location of the target object in the third image frame is corrected into the average location. On the contrary, when the offset is not greater than the offset threshold, the recognition device may not correct the temporary location of the target object in the third image frame.

In another possible implementation, when correcting the temporary location of the target object in the third image frame according to the average location, the recognition device may average the temporary location of the target object in the third image frame and the foregoing average location to obtain an average value, and correct the temporary location of the target object in the third image frame into the average value obtained again.

In addition, before performing smoothing correction on the respective temporary locations of the first object and the second object in the image frame included in the target video segment, the recognition device may further obtain a template image corresponding to a fourth image frame, where the fourth image frame is an image frame that is of the target object and that is not detected by the image detection model in the image frames included in the target video segment. The template image may be an image corresponding to a temporary location of the target object in a fifth image frame. The fifth image frame may be an image frame including the target object and that is detected by the image detection model prior to the fourth image frame in the image frames included in the target video segment. In addition, the fifth image frame may be an image frame including the target object and that is detected by the image detection model subsequent to the fourth image frame in the image frames included in the target video segment. The recognition device may perform template matching in the fourth image frame through the template image to obtain a temporary location of the target object in the fourth image frame.

In a certain situation, the image detection model may not detect a target object in an image frame. For example, when there is a target object in an image frame, the image detection model may not be able to detect a location of the target object in the image frame. Therefore, according to an embodiment, before performing the smoothing correction on a temporary location of a target object in each image frame, a location of the target object in the image frame that is not detected may be complemented through template matching first. In a specific example, for a current image frame that is not detected and that includes the target object, the recognition device may use an image corresponding to a location of a target object in an image frame that is detected previous to the current image frame and that is of the target object as a template, and perform template matching in the current image frame through the template to obtain a location with a highest degree of matching between images of locations in the current image frame and the template. When a matching degree corresponding to the location with the highest matching degree is greater than a preset matching degree threshold, the recognition device may determine the location with the highest matching degree as a location of the target object in the current image frame.

To avoid a mismatch, in this embodiment, when performing template matching in the current image frame by using the template image, the recognition device may perform template matching only in a preset range around a target location, and the target location may be a temporary location of the template image in an image frame that includes the target object and that is detected prior to the current image frame in terms of sequence of image frames.

When the image detection model cannot successfully detect at least two consecutive image frames at locations of the target object, the recognition device may first perform template matching in the first image frame in the at least two consecutive image frames, use an image at the location obtained through matching as a new template image, and perform template matching in the second image frame through the new template image.

In addition, in the foregoing embodiment, only an example in which an image corresponding to a location of a target object in an image frame that is of the target object and that is detected prior to the current image frame is used as a template (that is, sequential matching) is used for description, but during actual application, an image corresponding to a location of a target object in an image frame that is of the target object and that is detected subsequent to the current image frame may alternatively be used as a template (that is, reverse matching). Correspondingly, when the image detection model cannot successfully detect at least two consecutive image frames at locations of the target object, the recognition device may first perform template matching in the last image frame in the at least two consecutive image frames, use an image at the location obtained through matching as a new template image, and perform template matching in the penultimate image frame through the new template image.

Further, the recognition device may combine matching results obtained through the sequential matching and the reverse matching. For example, for the current image frame, the recognition device obtains a first location of the target object in the current image frame through the sequential matching, and obtains a second location of the target object in the current image frame through the reverse matching, averages the first location and the second location to obtain an average value, and obtains a temporary location of the target object in the current image frame. Alternatively, a location corresponding to a higher matching degree in the first location and the second location may be used as the temporary locations.

Using a basketball match video or a football match video as an example, key shots of the plays may be captured by tracking locations of the basketball and the basketball hoop, or key shots of the field goal may be captured by tracking locations of the football and the football field goal.

Considering that a pixel area of the ball in the video is relatively small, ball detection may be performed by using the Faster-RCNN according to an embodiment. For example, in a basketball match video, a preliminary detection result may be obtained by marking a specific quantity of samples of basketballs and basketball hoops under different scenes and by training using the Faster-RCNN model. During training, more false detection locations may be excluded by controlling sizes of a maximum detection box and a minimum detection box in the Faster-RCNN according to principles that there is only one basketball in one scene and a size of the basketball in different shot types has a specific rule (for example, the basketball in the long shot is relatively small).

During testing, some video segments (for example, interstitials, audience close-up shots, and the like) without a key shot may be excluded by using the classification result obtained from the foregoing step 501 to step 503, and detection is performed on video segments in which a key shot is likely to be present.

Considering the continuity of an object location over a short period of time in a continuous segment, some image frames with large offsets in location may be corrected through time-domain filtering to ensure the continuity of the object location change. In a specific example, for a continuous segment having n frames, the center pixel coordinates of the detected basketball hoop in each frame are used as the location of the basketball, and the location is denoted as $C_i$, $i=1, 2 \ldots, n$. For a location $C_k$ of the basketball in one frame, $\lambda$ is an offset threshold, and the following equation represents a possible relationship between the location of the basketball and the offset threshold.

$$\left| C_k \frac{1}{2t} \sum_{i=k-t, i \neq k}^{k+t} C_i \right| > \lambda \qquad \text{Eq. (1)}$$

The above relationship may suggest a problem with the location of the basketball in the image frame, and the location of the basketball in the image frame may be adjusted based on the following equation.

$$C_k = \frac{1}{2t} \sum_{i=k-t, i \neq k}^{k+t} C_i \qquad \text{Eq. (2)}$$

When there are some missing detections in the result of the detection, the missed detection results of some frames may affect the capture of the key shot. Therefore, the frame that is not detected may be complemented by using a tracking algorithm. Considering the irregular deformation of the ball in motion, a relatively greater tracking effect cannot be achieved by using either an edge feature or a HOG feature, and therefore, an RGB space template matching method may be used for ball tracking. For a $t^{th}$ frame that is not detected, if a detection result of a $(t-1)^{th}$ frame exists, an object image detected in the $(t-1)^{th}$ frame is used as a template. In the t frame, template matching is performed in a neighborhood corresponding to an object location in the $(t-1)^{th}$ frame, a location at which the matching degree is greater than the threshold is recorded, and a location with the highest matching degree is selected as a final matching result. For a continuous segment $P=(p_1, p_2, \ldots, p_n)$ having n frames, template matching (for the $t^{th}$ frame, the $(t-1)^{th}$ frame is used as a template) is performed once according to a time forward sequence, and tracking (for the $t^{th}$ frame, the $(t+1)^{th}$ frame is used as a template) is performed once according to a time backward sequence. For each frame that is not detected, a result with a higher matching degree in forward tracking and backward tracking is selected as a tracking result.

In the foregoing embodiment, the recognition device first performs template matching on an image frame that is of a target object and that is not detected by an image detection model, and then performs smoothing correction on a location of a target object in each image frame. According to another embodiment, the recognition device may further perform smoothing correction on a location of a target object in each image frame first, and then perform template matching on an image frame that is of a target object and that is not detected by the image detection model.

Step 506. Determine, in a case that a distance between the location of the first object and the location of the second object in a first image frame meets a preset condition, the key time point of the video according to a time point of the first image frame in the video. The first image frame may be any one of image frames included in the target video segment.

In addition, when the distance between the location of the first object and the location of the second object in the first image frame meets the preset condition, the recognition device determines the time point of the first image frame in the video as the key time point of the video.

More specifically, when the distance between the location of the first object and the location of the second object in the first image frame is less than a distance threshold, the recognition device may determine the key time point of the video according to the time point of the first image frame in the video.

For example, assuming that the time point of the first image frame in the video is 0:25:38 (that is, at the 25 minute and 38 second of the play time), and the distance between the location of the first object and the location of the second object in the first image frame is less than the distance threshold, in this case, the recognition device may determine 0:25:38 as the key time point of the video.

The recognition device obtaining a moving track of a key object can provide great convenience for capturing the key shot. Using the shot in a basketball game as an example, a location relationship between a basketball and a basketball hoop may be used for determining whether there is a shooting shot. For example, a video of a basketball match is inputted, and in each segment, a location $B_i$ of a basketball and a location $S_i$ of a basketball hoop in an $i^{th}$ frame are detected, and a threshold is set to k; when $|B_i-S_i|<k$ is satisfied, it is considered that there is a shot event, that is, there is a key shot near a time point of the $i^{th}$ frame in the video. In this case, the time point of the $i^{th}$ frame in the video is recognized as the key time point.

Figure 6:
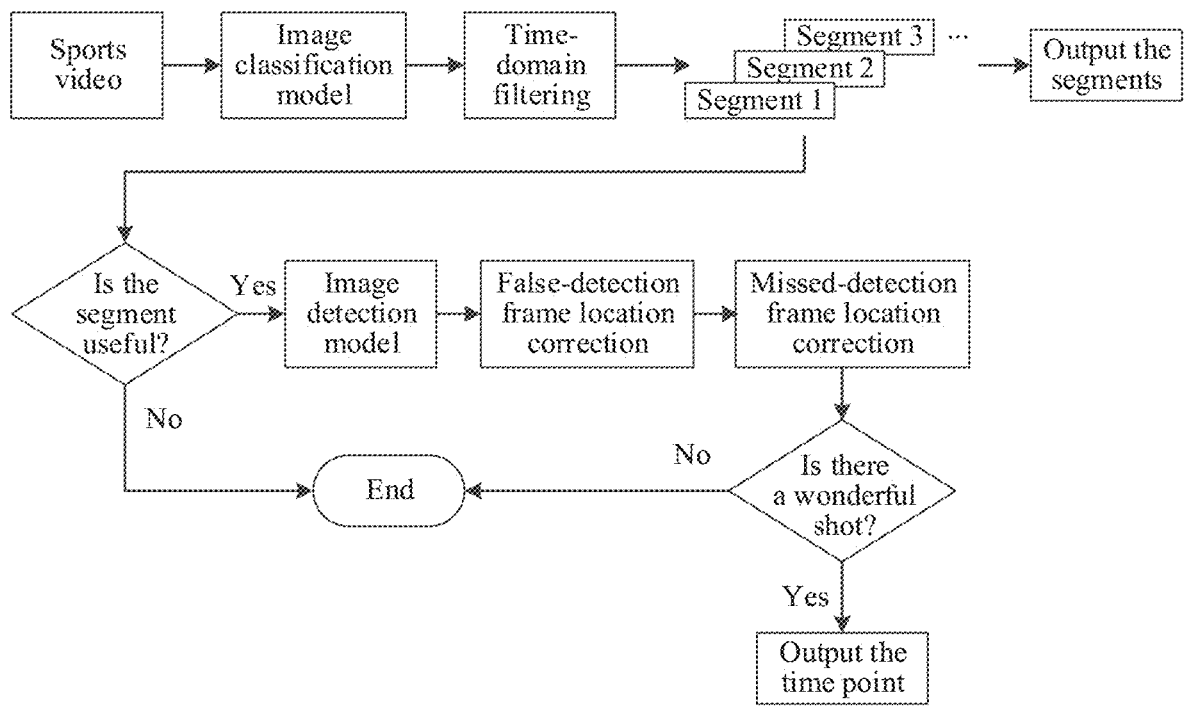
FIG. 6 is a diagram of a key time point recognition system according to an embodiment.

FIG. 6 is a framework diagram of a key time point recognition system according to an embodiment. As shown in FIG. 6, after a sports video is inputted, the video is segmented first, and shot types of frames of images in the video are classified by using a trained image classification model. After the classification is completed, because there may be very few frames that are misclassified, and considering that the sports video has a specific duration in each specific scene, a time-domain filtering (corresponding to the smoothing correction shown in step 502) is performed, and a shot type with a quantity of frames less than a specific threshold is corrected into a shot type that is adjacent to the shot type for a quantity of frames greater than the threshold. After the time-domain filtering, the video is divided into a plurality of segments according to shot types. The segment may be outputted as useful information, or may be used as input information for subsequent detection. For a ball game, the recognition device may determine whether the obtained segment is a useful segment (that is, for example, a segment corresponding to a long shot), and the trained image detection model may be configured to detect a key object (for example, the basketball and basketball hoop in the basketball game, or the football and the football goal in the football game). In each continuous segment, locations of the key objects may be considered to be consecutive (there are no hops), and therefore, in each continuous segment a false detection location at which a hop exists is corrected by using location information of a previous frame and a subsequent frame. For a frame that is not detected, template matching tracking is performed in a neighborhood of an object location detected in an adjacent frame. After the location information of the key object is obtained, the information may be used for determining whether there is a wonderful shot (for example, a goal). If it is determined that an image frame contains a crucial play of the video, a time point of the image frame in which the crucial play is located in the video is outputted.

In recent years, machine learning algorithms such as deep learning have shown strong capabilities in image classification and object detection. Using the basketball match video as an example, when determining a shooting shot through a location relationship between the basketball and the basketball hoop, the match video is segmented by using the CNN. After segments of the basketball match video that do not need to be extracted are removed, locations of the basketball and basketball hoop are detected in the remaining segments by using the Faster-RCNN. Considering the continuity of each segment in the time domain, the time-domain filtering is used for excluding false-detection frames with a relatively large location hop. Finally, the frame that is not detected is filled in a template matching tracking method, and the shot spot is determined through the location relationship between the basketball hoop and the basketball. The method according to this embodiment is robust and achieves high accuracy and a high recall rate for complex match scenes and camera movements. Specifically, in sports video analysis, the content may include the following points:

1. The machine learning algorithm is used for segmenting the sports match video, and segments of different scene shots are processed separately, thereby greatly improving the accuracy of determining subsequent key shots.

2. The object detection technology of the machine learning algorithm is combined with a tracking algorithm to detect key objects in a video, and the time-domain filtering is used for excluding false-detection frames on each individual segment, thereby greatly improving the detection accuracy and recall rate of determining subsequent key shots.

The foregoing embodiment is described only by using the basketball match video or football match video as an example. During actual application, the embodiments may be applied to other sports match video or non-sports match video in which the presence of a key shot may be determined through a location relationship between at least two key objects.

According to the foregoing embodiment, the segmentation of the sports video and the extraction of the key shot provide great convenience for subsequent video clipping, and the video editing person may extract key shots more conveniently to make highlights. At the same time, for a user side, the embodiments can provide users with the option to skip or select some scenes or shots, thereby improving user experience of watching a sports video.

According to the embodiments, a video is classified through a pre-trained machine learning model, and locations of a first object and a second object in an image frame of a video segment corresponding to a designated shot type are detected, and then whether a time point corresponding to the image frame can be used for determining a key time point of the video is determined according to a location relationship between the first object and the second object in the image frame. The machine learning model has relatively strong adaptability in image classification and object detection fields, and therefore, according to the embodiments, a key time point in a video can be recognized relatively accurately, thereby improving the accuracy of recognition.

Figure 7:
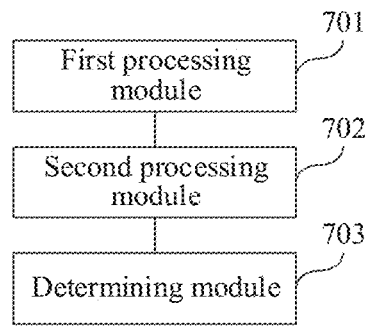
FIG. 7 is a structural block diagram of an apparatus for recognizing a key time point in a video according to an embodiment.

FIG. 7 is a structural block diagram of an apparatus for recognizing a key time point in a video according to an embodiment. The apparatus for recognizing a key time point in a video may be used in a computer device, to perform all or some of steps of the embodiment shown in FIG. 4 or FIG. 5. The apparatus for recognizing a key time point in a video may include a first processing module 701 configured to process each image frame in the video through an image classification model to obtain at least one video segment. The image classification model may be a machine learning model obtained by training according to a first image frame sample, the first image frame sample being an image frame marked with a shot type, and each video segment may include at least two adjacent image frames in the video, and each video segment may correspond to one shot type. The apparatus may include a second processing module 702 configured to process a target video segment through an image detection model to obtain respective locations of a first object and a second object in an image frame included in the target video segment. The image detection model may be a machine learning model obtained by training according to a second image frame sample, the second image frame sample being an image frame marked with the location of the first object and the location of the second object. The target video segment may be a video segment corresponding to a designated shot type in the at least one video segment. The apparatus may include a determining module 703 configured to determine, in a case that a distance between the location of the first object and the location of the second object in a first image frame meets a preset condition, the key time point of the video according to a time point of the first image frame in the video. The first image frame may be any one of image frames included in the target video segment.

The first processing module 701 may be configured to input each image frame in the video into the image classification model, to obtain a model classification result outputted by the image classification model, the model classification result being used for indicating a shot type to which each image frame in the video belongs; perform smoothing correction on the shot type to which each image frame in the video belongs and that is indicated by the model classification result; and divide the video into the at least one video segment according to the shot type to which each image frame in the video belongs after the smoothing correction.

During the performing of the smoothing correction on the shot type to which each image frame in the video belongs and that is indicated by the model classification result, the first processing module 701 may be configured to obtain a category mode of a first image group and a category mode of a second image group, the category mode indicating a shot type in the image group with a maximum quantity of corresponding image frames; the first image group being r image frames previous to the second image frame, the second image group being r image frames subsequent to the second image frame, the second image frame being any image frame in the video other than the first r frames and the last r frames, r being an integer greater than or equal to 1; and set, in a case that a shot type indicated by the category mode of the first image group is the same as a shot type indicated by the category mode of the second image group, the shot type to which the second image frame belongs to the shot type indicated by the category mode of the first image group.

In addition, during the dividing of the video into the at least one video segment according to the shot type to which each image frame in the video belongs after the smoothing correction, the first processing module 701 may be configured to divide the video into at least one temporary video segment according to the shot type to which each image frame in the video belongs after the smoothing correction; shot types to which image frames included in each temporary video segment belong being the same, and shot types to which image frames included in two adjacent temporary video segments belong being different; modify, in a case that a quantity of image frames included in a target temporary video segment is less than a preset quantity threshold, a shot type to which each image frame in the target temporary video segment belongs into a shot type to which each image frame in a temporary video segment previous to the target temporary video segment belongs, and combine the target temporary video segment into the temporary video segment previous to the target temporary video segment; the target temporary video segment being any temporary video segment in the at least one temporary video segment other than a first temporary video segment; and use each remaining temporary video segment after combination as the at least one video segment.

The second processing module 702 may be configured to input each image frame in the target video segment into the image detection model, to obtain a model detection result outputted by the image detection model, the model detection result being used for indicating respective temporary locations of the first object and the second object in the image frame included in the target video segment; and perform smoothing correction on the respective temporary locations of the first object and the second object in the image frame included in the target video segment, to obtain the respective locations of the first object and the second object in the image frame included in the target video segment.

During the performing of the smoothing correction on the respective temporary locations of the first object and the second object in the image frame included in the target video segment, the second processing module 702 may be configured to obtain temporary locations of a target object in image frames of a third image group and a fourth image group, the target object being any one of the first object and the second object, the third image group being w image frames previous to a third image frame, the fourth image group being w image frames subsequent to the third image frame, the third image frame being any image frame in the target video segment other than the first w frames and the last w frames, w being an integer greater than or equal to 1; obtain an average location, the average location being an average value of the temporary locations of the target object in the image frames of the third image group and the fourth image group; and correct the temporary location of the target object in the third image frame according to the average location.

During the correcting of the temporary location of the target object in the third image frame according to the average location, the second processing module 702 may be configured to obtain an offset of the temporary location of the target object in the third image frame relative to the average location; and correct, in a case that the offset is greater than an offset threshold, the temporary location of the target object in the third image frame to be the average location.

The second processing module 702 may be further configured to, before the performing of the smoothing correction on the respective temporary locations of the first object and the second object in the image frame included in the target video segment, obtain a template image corresponding to a fourth image frame, the fourth image frame being an image frame that is of the target object and that is not detected by the image detection model in the image frames included in the target video segment; the template image being an image corresponding to a temporary location of the target object in a fifth image frame; the fifth image frame being an image frame that is of the target object and that is detected by the image detection model previous to the fourth image frame in the image frames included in the target video segment and/or the fifth image frame being an image frame that is of the target object and that is detected by the image detection model subsequent to the fourth image frame in the image frames included in the target video segment; and perform template matching in the fourth image frame through the template image, to obtain a temporary location of the target object in the fourth image frame.

The determining module 703 may be configured to determine, in a case that the distance between the location of the first object and the location of the second object in the first image frame is less than a distance threshold, the key time point of the video according to the time point of the first image frame in the video.

The determining module 703 is specifically configured to determine, in a case that the distance between the location of the first object and the location of the second object in the first image frame meets the preset condition, the time point of the first image frame in the video as the key time point of the video.

In addition, the shot type includes at least one of a long shot, a close shot, a close-up shot, an audience shot, and an advertisement shot.

For functions of the modules, reference may be made to descriptions of the steps in the embodiment shown in FIG. 4 or FIG. 5, and details are not described herein.

Figure 8:
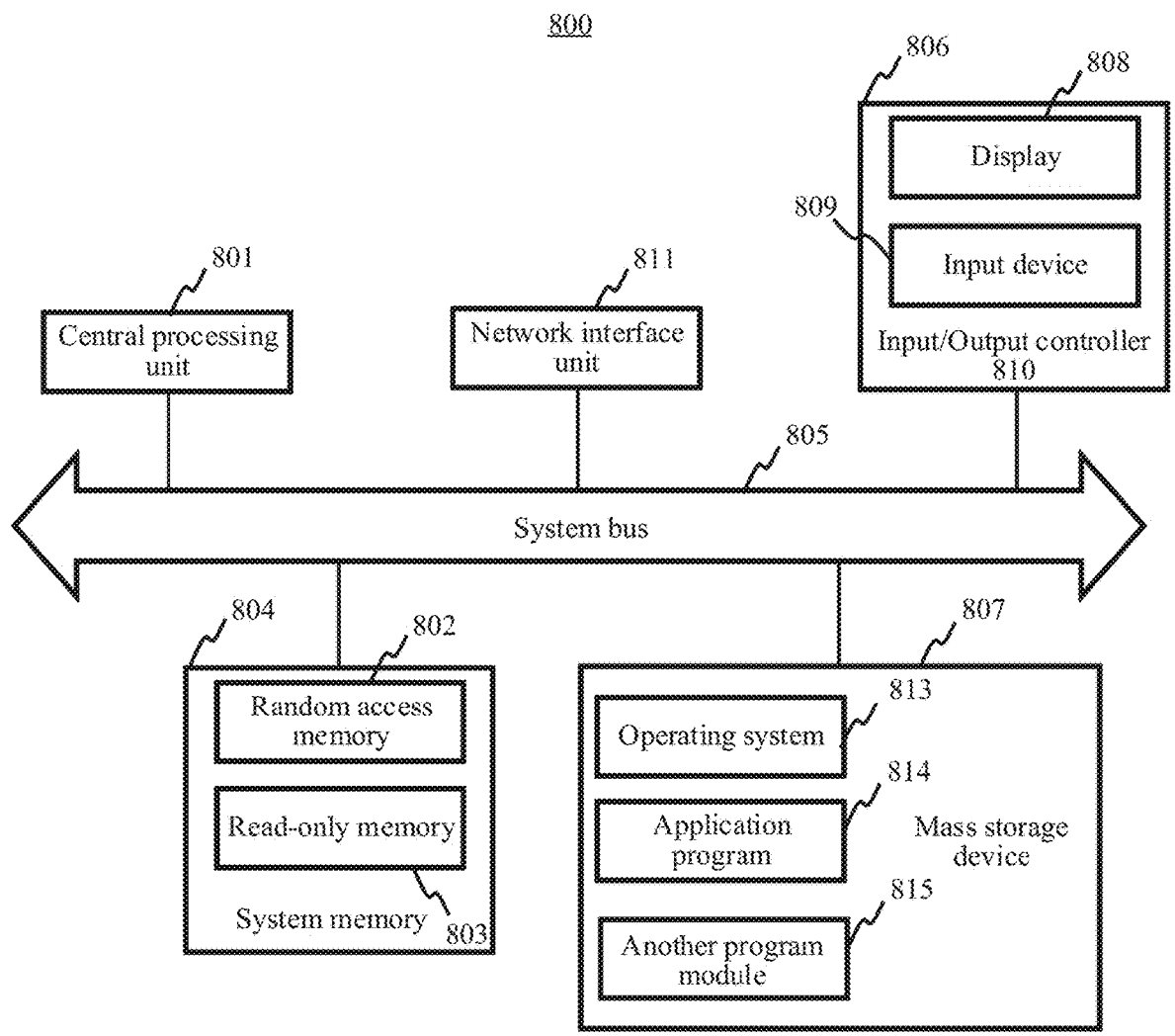
FIG. 8 is a schematic structural diagram of a computer device according to an embodiment.

FIG. 8 is a schematic structural diagram of a computer device according to an embodiment. The computer device 800 includes a central processing unit (CPU) 801, a system memory 804 including a random access memory (RAM) 802 and a read-only memory (ROM) 803, and a system bus 805 connecting the system memory 804 and the CPU 801. The computer device 800 further includes a basic input/output system (I/O system) 806 configured to transmit information between components in the computer, and a mass storage device 807 configured to store an operating system 813, an application program 814, and another program module 815.

The basic I/O system 806 includes a display 808 configured to display information, and an input device 809 used by a user to input information, such as a mouse or a keyboard. The display 808 and the input device 809 are both connected to the CPU 801 by an input/output (I/O) controller 810 connected to the system bus 805. The basic I/O system 806 may further include the I/O controller 810 for receiving and processing an input from a plurality of other devices such as a keyboard, a mouse, or an electronic stylus. Similarly, the I/O controller 810 further provides an output to a display screen, a printer, or another type of output device.

The mass storage device 807 is connected to the CPU 801 by using a mass storage controller (not shown) connected to the system bus 805. The mass storage device 807 and an associated computer-readable medium provide non-volatile storage for the computer device 800. That is, the mass storage device 807 may include a computer-readable medium (not shown), such as a hard disk or a CD-ROM drive.

The computer-readable medium may include a computer storage medium and a communication medium. The computer storage medium includes volatile and non-volatile, removable and non-removable media that store information such as computer-readable instructions, data structures, program modules, or other data and that are implemented by using any method or technology. The computer storage medium includes a RAM, a ROM, an EPROM, an EEPROM, a flash memory, or another solid state storage technology, a CD-ROM, a DVD, or another optical storage, a magnetic cassette, a magnetic tape, a magnetic disk storage, or another magnetic storage device. However, it may be readily apparent to a person skilled in the art that the computer storage medium is not limited to the foregoing embodiments. The system memory 804 and the mass storage device 807 may be generally referred to as a memory.

The computer device 800 may be connected to the Internet or another network device by using a network interface unit 811 connected to the system bus 805.

The memory further stores one or more computer-readable instructions. The one or more computer-readable instructions are stored in the memory. The CPU 801 executes the one or more computer-readable instructions to implement all or some of steps of the methods described with reference to FIG. 4 and FIG. 5.

In an embodiment, a non-temporary computer-readable storage medium including an instruction, for example, a memory including a computer program (an instruction), is further provided, and the program (the instruction) may be executed by a processor of a computer device to complete all or some of steps of the methods shown in the embodiments. For example, the non-temporary computer-readable storage medium may be a ROM, a RAM, a CD-ROM, a magnetic tape, a floppy disk, an optical data storage device, or the like.

A person skilled in the art may make modifications and replacements to some or all of the embodiments described above without departing from the scope and spirit of the disclosure. This disclosure is intended to cover any variations, uses and/or adaptation of the embodiments of the disclosure. The embodiments of the disclosure described above are only considered as examples, and the scope and the spirit of this disclosure are defined in the following claims.

What is claimed is:

1. A method for recognizing a key time point in a video, performed by a computer device, the method comprising:
   obtaining at least one video segment by processing each image frame in the video by an image classification model, the image classification model being a machine learning model obtained by training according to a first sample image frame marked with a shot type, wherein each of the at least one video segment comprises at least two consecutive image frames in the video and each of the at least one video segment corresponds to one shot type among a plurality of shot types;

determining a target video segment in the at least one video segment based on the shot type of the at least one video segment;

obtaining a location of a first object and a location of a second object in an image frame of the target video segment by an image detection model, the image detection model being a machine learning model obtained by training according to a second sample image frame marked with the location of the first object and the location of the second object; and based on a distance between the location of the first object and the location of the second object in the image frame satisfying a preset condition, determining a time point of the image frame as the key time point of the video, wherein the obtaining the at least one video segment through the image classification model comprises:

inputting each image frame in the video into the image classification model to obtain a model classification result that indicates the shot type for the each image frame in the video;

performing a smoothing correction by determining whether there exists a first category mode of a first image group immediately prior to each classified image frame in the video, and a second category mode of a second image group immediately subsequent to the each classified image frame, wherein the each image frame is not included in the first image group or the second image group, wherein the first category mode indicates a shot type of the first image group having a maximum quantity of corresponding image frames of the first group, and wherein the second category mode indicates a shot type of the second image group having a maximum quantity of corresponding image frames of the second group;

based on the first category mode and the second category mode being the same, setting the shot type of the each image frame to the shot type of the first image group.

2. The method according to claim 1, wherein the obtaining the at least one video segment through the image classification model comprises:

dividing the video into the at least one video segment according to the shot type of the each smoothed classified image frame in the video.

3. The method according to claim 2, wherein the first image group includes r image frames prior to the each classified image frame, the second image group including r image frames subsequent to the each classified image frame, the each classified image frame being any one image frame among a plurality of image frames in the video other than the first r frames and the last r frames, where r is an integer greater than or equal to 1.

4. The method according to claim 2, wherein the dividing the video into the at least one video segment according to the shot type of the each image frame in the video comprises:

dividing the video into at least one temporary video segment according to the shot type of the each smoothed classified image frame in the video such that each of the at least one temporary video segment includes image frames belong to the same shot type, wherein the shot types of two consecutive temporary video segments are different;

based on a quantity of image frames in a target temporary video segment being less than a preset quantity threshold, modifying a shot type of each image frame in the target temporary video segment into a shot type of each image frame in a temporary video segment previous to the target temporary video segment, and combining the target temporary video segment with the temporary video segment previous to the target temporary video segment, wherein the target temporary video segment is any one temporary video segment in the at least one temporary video segment other than a first temporary video segment; and using each remaining temporary video segment in the at least one temporary video segment as the at least one video segment.

5. The method according to claim 1, wherein the obtaining the location of the first object and the location of the second object in the image frame of the target video segment comprises:

inputting each image frame in the target video segment into the image detection model to obtain a model detection result that indicates respective temporary locations of the first object and the second object in the image frame of the target video segment; and performing the smoothing correction on the respective temporary locations of the first object and the second object in the image frame of the target video segment to obtain the respective locations of the first object and the second object in the image frame of the target video segment.

6. The method according to claim 5, wherein the performing the smoothing correction on the respective temporary locations of the first object and the second object in the image frame of the target video segment comprises:

obtaining temporary locations of a target object in image frames of a third image group and a fourth image group, the target object being any one of the first object and the second object, the third image group including w image frames previous to a third image frame, the fourth image group including w image frames subsequent to the third image frame, the third image frame being any one of a plurality of image frames in the target video segment other than the first w frames and the last w frames, where w is an integer greater than or equal to 1;

obtaining an average location that is indicated as an average value of the temporary locations of the target object in the image frames of the third image group and the fourth image group; and correcting the temporary location of the target object in the third image frame according to the average location.

7. The method according to claim 6, wherein the correcting the temporary location of the target object in the third image frame according to the average location comprises:

obtaining an offset of the temporary location of the target object in the third image frame relative to the average location; and correcting, in a case that the offset is greater than an offset threshold, the temporary location of the target object in the third image frame to be the average location.

8. The method according to claim 5, wherein the method further comprises:

obtaining a template image corresponding to a fourth image frame which is an image frame including a target object and that is not detected by the image detection model, the target object being any one of the first object and the second object, the template image being an image corresponding to a temporary location of the target object in a fifth image frame which is an image frame including the target object and that is detected by the image detection model previous or subsequent to the fourth image frame among the image frames in the target video segment; and performing a template matching in the fourth image frame through the template image, to obtain the temporary location of the target object in the fourth image frame.

9. The method according to claim 1, wherein the determining the time point of the image frame as the key time point of the video comprises:

based on the distance between the location of the first object and the location of the second object in the first image frame being less than a predetermined distance threshold, determining the time point of the first image frame in the video as the key time point of the video.

10. The method according to claim 1, wherein the determining the time point of the image frame as the key time point of the video comprises:

based on the distance between the location of the first object and the location of the second object in the first image frame being greater than or equal to a predetermined distance threshold, determining that the time point of the first image frame in the video is not the key time point of the video.

11. An apparatus for recognizing a key time point in a video, comprising:

at least one memory storing computer program code; and at least one processor configured to access the at least one memory and operate as instructed by the computer program code, the computer program code comprising:

first processing code configured to cause the at least one processor to obtain at least one video segment by processing each frame in the video by an image classification model, the image classification model being a machine learning model obtained by training according to a first sample image frame marked with a shot type, wherein each of the at least one video segment comprises at least two consecutive image frames in the video and each of the at least one video segment corresponds to one shot type among a plurality of shot types;

second processing code configured to cause the at least one processor to determine a target video segment in the at least one video segment based on the shot type of the at least one video segment and obtain a location of a first object and a location of the second object in an image frame of the target video segment by an image detection model, the image detection model being a machine learning model obtained by training according to a second sample image frame marked with the location of the first object and the location of the second object; and determining code configured to cause the at least one processor to, based on a distance between the location of the first object and the location of the second object in the image frame satisfying a preset condition, determine a time point of the image frame as the key time point of the video, wherein the first processing code is further configured to cause the at least one processor to:

input each image frame in the video into the image classification model to obtain a model classification result that indicates the shot type for the each image frame in the video;

determine whether there exists a first category mode of a first image group immediately prior to a second image frame, and a second category mode of a second image group immediately subsequent to the second image frame, wherein the second image frame is not included in the first image group or the second image group, wherein the first category mode indicates a shot type of the first image group having a maximum quantity of corresponding image frames of the first group, and the second category mode indicates a shot type of the second image group having a maximum quantity of corresponding image frames of the second group;

based on the first category mode and the second category mode being the same, setting the shot type of the second image frame to the shot type of the first image group; and performing a smoothing correction according to the shot type of the each image frame in the video.

12. The apparatus according to claim 11, wherein the first processing code is further configured to cause the at least one processor to:

divide the video into the at least one video segment according to the shot type of the each image frame in the video.

13. The apparatus according to claim 12, wherein the first image group includes r image frames prior to the second image frame, the second image group including r image frames subsequent to the second image frame, the second image frame being any one image frame among a plurality of image frames in the video other than the first r frames and the last r frames, where r is an integer greater than or equal to 1.

14. The apparatus according to claim 12, wherein the first processing code is further configured to cause the at least one processor to:

divide the video into at least one temporary video segment according to the shot type of the each image frame in the video such that each of the at least one temporary video segment includes image frame belong to the same shot type, wherein the shot types of two consecutive temporary video segments are different;

based on a quantity of image frames in a target temporary video segment being less than a preset quantity threshold, modify a shot type of each image frame in the target temporary video segment into a shot type of each image frame in a temporary video segment previous to the target temporary video segment, and combine the target temporary video segment with the temporary video segment previous to the target temporary video segment, wherein the target temporary video segment is any one temporary video segment in the at least one temporary video segment other than a first temporary video segment; and use each remaining temporary video segment in the at least one temporary video segment as the at least one video segment.

15. The apparatus according to claim 11, wherein the second processing code is further configured to cause the at least one processor to:

input each image frame in the target video segment into the image detection model to obtain a model detection result that indicates respective temporary locations of the first object and the second object in the image frame of the target video segment; and perform the smoothing correction on the respective temporary locations of the first object and the second object in the image frame of the target video segment to obtain the respective locations of the first object and the second object in the image frame of the target video segment.

16. The apparatus according to claim 15, wherein the second processing code is further configured to cause the at least one processor to:

obtain temporary locations of a target object in image frames of a third image group and a fourth image group, the target object being any one of the first object and the second object, the third image group including w image frames previous to a third image frame, the fourth image group including w image frames subsequent to the third image frame, the third image frame being any one of a plurality of image frames in the target video segment other than the first w frames and the last w frames, where w is an integer greater than or equal to 1;

obtain an average location that is indicated as an average value of the temporary locations of the target object in the image frames of the third image group and the fourth image group; and correct the temporary location of the target object in the third image frame according to the average location.

17. The apparatus according to claim 16, wherein the second processing code is further configured to cause the at least one processor to:

obtain an offset of the temporary location of the target object in the third image frame relative to the average location; and correct, in a case that the offset is greater than an offset threshold, the temporary location of the target object in the third image frame to be the average location.

18. The apparatus according to claim 15, wherein the second processing code is further configured to cause the at least one processor to:

obtain a template image corresponding to a fourth image frame which is an image frame including the target object and that is not detected by the image detection model, the target object being any one of the first object and the second object, the template image being an image corresponding to a temporary location of the target object in a fifth image frame which is an image frame including the target object and that is detected by the image detection model previous or subsequent to the fourth image frame among the image frames in the target video segment; and perform a template matching in the fourth image frame through the template image to obtain the temporary location of the target object in the fourth image frame.

19. The apparatus according to claim 11, wherein the determining code is further configured to cause the at least one processor to, based on the distance between the location of the first object and the location of the second object in the first image frame being less than a predetermined distance threshold, determining the time point of the first image frame in the video as they key time point of the video.

20. A non-transitory computer-readable storage medium storing at least one computer program code configured to cause a computer processor to:

obtain at least one video segment by processing each frame in a video by an image classification model, the image classification model being a machine learning model obtained by training according to a first sample image frame marked with a shot type, wherein each of the at least one video segment comprises at least two consecutive image frames in the video and each of the at least one video segment corresponds to one shot type among a plurality of shot types;

determine a target video segment in the at least one video segment based on the shot type of the at least one video segment;

obtain a location of a first object and a location of a second object in an image frame of the target video segment by an image detection model, the image detection model being a machine learning model obtained by training according to a second sample image frame marked with the location of the first object and the location of the second object; and based on a distance between the location of the first object and the location of the second object in the image frame satisfying a preset condition, determine a time point of the image frame as a key time point of the video, wherein the obtaining the at least one video segment through the image classification model comprises:

inputting each image frame in the video into the image classification model to obtain a model classification result that indicates the shot type for the each image frame in the video;

determining whether there exists a first category mode of a first image group immediately prior to a second image frame, and a second category mode of a second image group immediately subsequent to the second image frame, wherein the second image frame is not included in the first image group or the second image group, wherein the first category mode indicates a shot type of the first image group having a maximum quantity of corresponding image frames of the first group, and wherein the second category mode indicates a shot type of the second image group having a maximum quantity of corresponding image frames of the second group;

based on the first category mode and the second category mode being the same, setting the shot type of the second image frame to the shot type of the first image group; and performing a smoothing correction according to the shot type of the each image frame in the video.

\* \* \* \* \*